(12) United States Patent
Blankenship et al.

(10) Patent No.: US 6,657,163 B1
(45) Date of Patent: Dec. 2, 2003

(54) SYSTEM AND METHOD FOR SELECTIVE APPLICATION OF POWER TO WELDING EQUIPMENT

(75) Inventors: George D. Blankenship, Chardon, OH (US); Larry L. Church, Jefferson, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 17 days.

(21) Appl. No.: 10/067,064

(22) Filed: Feb. 6, 2002

(51) Int. Cl.[7] .................................................. B23K 9/10
(52) U.S. Cl. ............................... 219/137.71; 219/130.01
(58) Field of Search ........................ 219/130.1, 130.21, 219/137.71, 137 PS, 130.01

(56) References Cited

U.S. PATENT DOCUMENTS 6,359,258 B1    3/2002   Blankenship et al.

FOREIGN PATENT DOCUMENTS

| CH | 609897 | * | 3/1979 | ............. 219/130.1 |
| DE | 223896 | * | 6/1985 | ............ 219/130.21 |

* cited by examiner

Primary Examiner—Clifford C. Shaw
(74) Attorney, Agent, or Firm—Fay, Sharpe, Fagan, Minnich & McKee

(57) ABSTRACT

Systems and methods are disclosed for determining an impedance between a grounding device such as a welding wire feeder ground clamp and a power supply common, and selectively allowing current flow through an electrical device associated with a welding operation according to the impedance.

34 Claims, 3 Drawing Sheets

SYSTEM AND METHOD FOR SELECTIVE APPLICATION OF POWER TO WELDING EQUIPMENT

FIELD OF THE INVENTION

The present invention relates generally to welding equipment and more particularly to systems and methods for selective application of power to an electrical device associated with a welding operation.

BACKGROUND OF THE INVENTION

Electric welders and associated electrical apparatus are employed in a variety of field applications, in which electric power is applied between a workpiece to be welded and a filler material, such as welding wire, which operates as a consumable electrode. For instance, in many conventional welding systems, a controlled DC voltage of between 20 and 100 volts is applied to the welding wire while the workpiece is connected to a power supply common. The application of such power is controlled so as to melt the welding wire to provide molten filler material to a weld joint in a controlled fashion. Welders commonly include an electric power supply which operates to control a voltage potential between the workpiece and a metal welding wire being fed to the weld joint at a controlled feed rate or speed, wherein a wire feeder controls the wire feed rate. Often, the wire feeder includes a metal roll cage contacting the workpiece, which may serve as a common return conductor path to the workpiece, as well as providing a carrying handle for transport of the wire feeder. The welder and associated power supply are sometimes located remotely from the weld station and the workpiece, whereas the wire feeder is typically located proximate the weld station. The wire feeder typically includes electrically powered (e.g., automatic or semi-automatic) wire feed mechanisms, such as one or more pairs of motor driven feed rollers which advance the weld wire to the weld operation.

In a common situation, the wire feeder receives electrical power for operation of such wire feed mechanisms from the welder power supply. In this configuration, a first voltage potential is connected to the wire feeder via the weld wire. The wire feeder chassis may serve as a common return path, for instance, wherein the wire feeder is supported on large metal structures being welded. Alternatively, an electrical return path is sometimes provided from the wire feeder to a grounded workpiece through a grounding device, such as a grounding clamp type connector. Where the wire feeder includes a metal roll cage, the ground clamp may be secured to the roll cage in order to provide the return path via the workpiece. Thus, for example, an operator may manually connect a ground clamp to the roll cage or to the workpiece as it enters the weld station, thereby establishing a low impedance return path for the powered wire feeder. In this instance, the wire feeder chassis may be electrically isolated from the electrical system, and the manually operated ground clamp may include insulated hand grip areas. In addition to wire feeders, other electrical devices associated with a weld operation may similarly receive operational power from the welder power supply, wherein a return path may be provided to the power supply common via a ground clamp or other grounding device, or alternatively via the chassis.

Whether the common return path is provided through a grounding device, or through the wire feeder chassis, it is desirable to ensure a proper, low impedance, return path connection prior to operation of the wire feeder or other electrical devices associated with the welding operation. In situations where multiple workpieces are welded at a welding station, the operator must secure the ground clamp from the wire feeder device to each workpiece prior to beginning the weld operation. Where the wire feeder chassis serves as the common return path, it is necessary to ensure connection of the chassis to the grounded workpiece. In addition, where a wire feeder with a metal roll cage is transported to a new welding site, the ground clamp must be secured to the roll cage prior to beginning operation. Although not recommended, the welder power supply is often left energized while finished workpieces are replaced with new ones, during which time the return path (e.g., through the device chassis or ground clamp) is interrupted. Similarly, where the wire feeder or other electrical device is transported, the common return path may be improperly re-established. Improper re-establishment of the return path may occur, for example, where a ground clamp is connected to the power supply common through a finite intermediate impedance, whereupon operation of the electrical device may cause stress or damage to the device. Thus, there is a need for systems and methods for selective application of power to an electrical device associated with a welding operation, for example, by which the propriety of a device return path connection is ensured prior to operation thereof.

SUMMARY OF THE INVENTION

The following presents a simplified summary of the invention in order to provide a basic understanding of one or more aspects thereof. This summary is not an extensive overview of the invention, and is intended neither to identify key or critical elements of the invention, nor to delineate the scope of the invention. Its primary purpose is to present some concepts of the invention in a simplified form as a prelude to the more detailed description that is presented later. The present invention is directed to systems and methods for determining or sensing an impedance between a grounding device and an electrical device related to a welding operation, and for controlling current flow through the electrical device according to the sensed impedance. The invention may be employed for ensuring proper ground connection of the electrical device prior to allowing current flow therethrough by discriminating between proper ground or return path connections and improper connections. For example, the invention may be advantageously employed to determine whether a welding wire feeder common terminal is properly secured to a welder power supply common before allowing current to flow through the wire feeder. This provides significant advantages in applications in which the wire feeder common connection is established using a ground clamp grounding device or the like, wherein an operator secures the ground clamp terminals to a grounded workpiece prior to performing a welding operation thereon.

One aspect of the invention provides a discriminator system for selectively allowing current to flow through an electrical device associated with a weld operation. The system, which may be employed in association with a wire feeder or other device, includes a first switch component, such as a transistor, relay, or the like, connected between a common or ground terminal of the electrical device and a grounding device, such as a wire feeder ground clamp or the like, to selectively provide electrical connection therebetween according to a first control signal. A sensor is provided to sense an impedance between the grounding device and a power supply common, and to provide the control signal to the switch component according to the impedance. The system can thus distinguish between appropriate (e.g., low impedance) common connections, and other inappropriate impedances, for example; such as by determining whether the sensed impedance exceeds a threshold. In one implementation, the control signal can comprise a first state allowing current flow through the device when the impedance is less than the threshold, a second state preventing or inhibiting current flow when the impedance is greater than the threshold.

The sensor may comprise a sense resistor with one terminal connected to one of a power supply voltage and the grounding device, and a second switch selectively connecting the other sense resistor terminal to the other of the power supply voltage and the grounding device according to a second control signal. A sensor circuit senses the voltage across the sense resistor and provides the first control signal to the first switch in accordance therewith. The connection of the sense resistor between the power supply voltage and the grounding device may be intermittent, such as using pulse width modulation, to limit the amount of average current flow through the grounding device in case of improper grounding thereof. Thus, although a sense current is used to measure the impedance between the grounding device and the power supply common, the sense current may be controlled so as to prevent adverse effects while obtaining the impedance value. In this regard, the sense resistor may be advantageously sized so as to limit the sense current to a predetermined value. Furthermore, the sense resistor size may be adjusted so as to provide for determination of a specific range of impedances of interest between the grounding device and the power supply common. In this manner, an impedance below a certain threshold value may be determined to be proper, whereas a higher return path impedance is detected and used to inhibit current flow through the electrical device, by which protection of the device may be facilitated.

Another aspect of the present invention provides methodologies for selectively allowing current to flow through an electrical device, wherein an impedance between a grounding device and a power supply common is sensed and the device is selectively connected to the grounding device according to the sensed impedance. For example, in order to prevent or inhibit device current flow where an improper common return connection exists, the electrical device may be connected to the grounding device (e.g., to thereby establish a conductive return path) if the sensed impedance is less than a threshold value and disconnected therefrom if the impedance is greater than the threshold value. Sensing the impedance may be accomplished in any appropriate manner. For example, a sense resistor may be connected between a power supply voltage terminal and the grounding device, and a voltage across the sense resistor may be ascertained. The sense resistor may be intermittently switched, such as through pulse width modulation applied to a transistor or relay type switching device, whereby the resulting sense current may be limited to a predetermined value.

Yet another aspect of the invention provides systems for determining an impedance between a grounding clamp and a power supply common. A sense resistor is provided in the system, having a first terminal in electrical communication with one of a power supply voltage terminal and the grounding device, along with a switching device operative to selectively connect a second terminal of the sense resistor to the other of the power supply voltage terminal and the grounding device. The system further comprises a sensor circuit operative to sense a voltage across the sense resistor and to provide a signal indicative of the impedance between the grounding clamp and the power supply common according to the voltage across the sense resistor.

The following description and drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
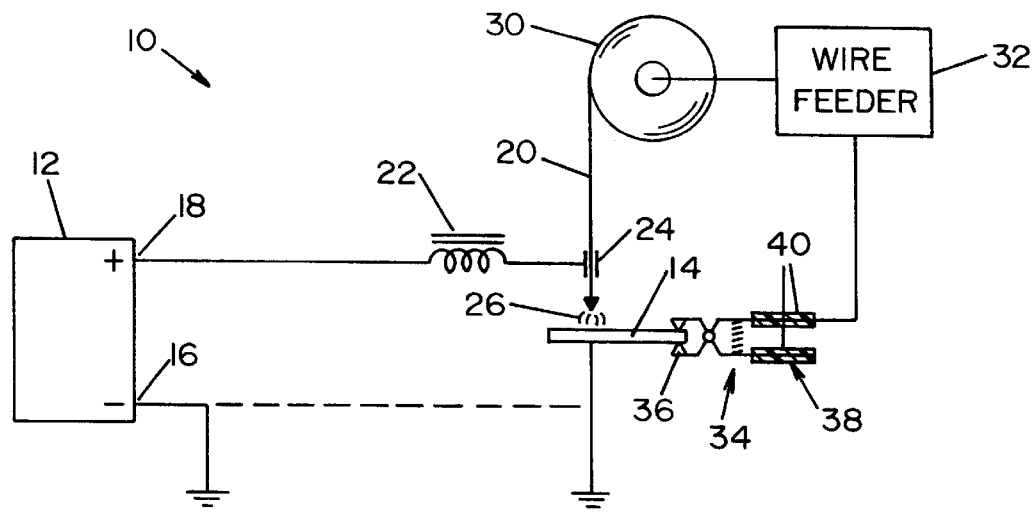
FIG. 1 is a side elevation view illustrating a conventional welder power supply and a wire feeder device obtaining electrical power from the power supply and providing weld wire to a weld operation in a controlled fashion.

The present invention will now be described with reference to the drawings wherein like reference numerals are used to refer to like elements throughout. Apparatus and methodologies are provided for sensing a return path impedance, and for selectively allowing current flow through an electrical device associated with a welding operation, by which the adverse effects associated with operation thereof without proper return path connection may be mitigated or avoided. Although illustrated and described hereinafter in association with a welding wire feeder device, it will be appreciated that the present invention finds utility in association with other welding devices apart from wire feeders, and that such implementations are deemed as falling within the scope of the appended claims.

Referring initially to FIG. 1, a conventional welding system 10 is illustrated, comprising a welder 12 operational to perform a weld operation on a workpiece 14. The workpiece 14 is grounded to a power supply common terminal 16 at the welder 12, and a power supply voltage terminal 18 applies electrical power, such as a DC voltage between 20 and 100 volts to a welding wire consumable electrode 20 through an inductor 22 and a contact tip 24. The application of the DC voltage across the weld wire 20 and the workpiece 14 creates an arc 26 in a gap therebetween, resulting in controlled melting of the consumable wire 20 and deposition of molten weld material, by which a welding operation is performed, such as joinder of two portions (not shown) of the workpiece 14. The contact tip 24 provides electrical connection between the inductor 22 and the weld wire 20, which is advanced therethrough from a rotary supply reel 30 of a wire feeder device 32. The wire feeder 32 comprises electrically powered actuator mechanisms (not shown) for providing weld wire 20 through the contact tip 24 to the workpiece 14 in a controlled fashion, and obtains electrical power via the electrical connection of the inductor 22, the contact tip 24 and the weld wire 20 to the power supply voltage terminal 18. Thus, the welder 12 powers both the weld operation and the wire feeder 32, wherein an electrical return path is provided by connection of the electrical wire feeder device 32 to the power supply common 16 (e.g., to the workpiece 14) using a ground clamp device 34. The ground clamp 34 comprises spring biased jaws 36 and corresponding handles 38 having electrically insulating grips 40 thereon.

Figure 2:
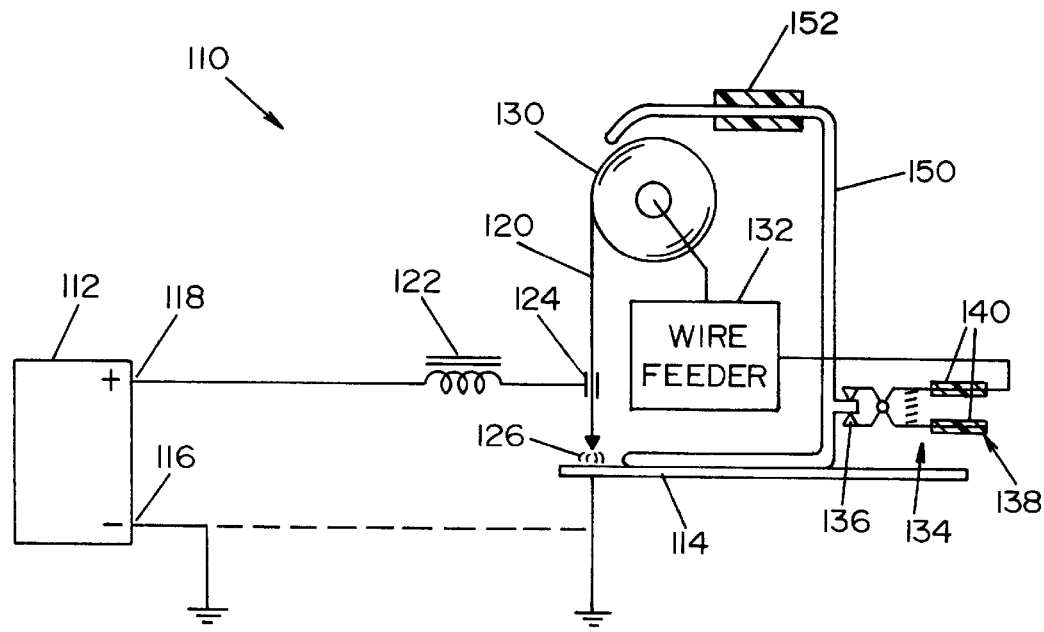
FIG. 2 is a side elevation view illustrating another conventional welder power supply and a wire feeder device having a metal wire cage associated therewith.

Another exemplary welding system 110 is illustrated in FIG. 2, wherein a workpiece 114 is grounded to a power supply common terminal 116 of a welder 112, and a power supply voltage terminal 118 applies electrical power to a welding wire 120 through an inductor 122 and a contact tip 124. An arc 126 is established between the weld wire 120 and the workpiece 114, by which controlled melting and deposition of the consumable wire 120 is achieved. The contact tip 124 provides electrical connection between the inductor 122 and the weld wire 120, which is provided from a rotary reel 130 in a controlled fashion by a wire feeder device 132. The wire feeder 132 comprises a metal wire cage 150 providing electrical contact with the workpiece 114, includes electrically insulated carrying grips 152 whereby the cage 150 may function as a carrying handle for the wire feeder 132, which in turn obtains electrical power via the electrical connection of the inductor 122, the contact tip 124 and the weld wire 120. As with the welder 12 of FIG. 1, the welder 112 powers both the weld operation and the wire feeder 132, wherein an electrical return path is provided by connection of the wire feeder 132 to the power supply common 116 (e.g., to the workpiece 114 via the metal wire cage 150) using a ground clamp device 134. The ground clamp 134 comprises spring biased jaws 136 and corresponding handles 138 having electrically insulative grips 140 thereon.

As illustrated in the systems 10 and 110 of FIGS. 1 and 2, respectively, the current through the wire feeders 32, 132 is returned to the power supply common terminals 16, 116 by way of the ground clamps 34, 134, respectively. In this regard, it is noted that where the grounding devices 34, 134 used to establish the return path for wire feeder current to the power supply common 16, 116 are improperly secured to the workpiece 14 or the cage 150 (e.g., the impedance between the devices 32, 132 and the corresponding power supply commons 16, 116 is great), damage or stress may result to one or more components of the systems 10, 110, respectively or the components thereof. As an example, the contact jaws 136 of the clamp 134 maybe corroded, or maybe incorrectly attached to other than a conductive surface of the wire feeder cage 150, resulting in other than a good low impedance return path for wire feeder device current. In another possible situation, an operator may inadvertently fail to connect the clamp 134, and begin a welding operation, whereupon a very high impedance is seen between the wire feeder return terminal and the power supply common 116, preventing the wire feeder 132 from operating.

Figure 3:
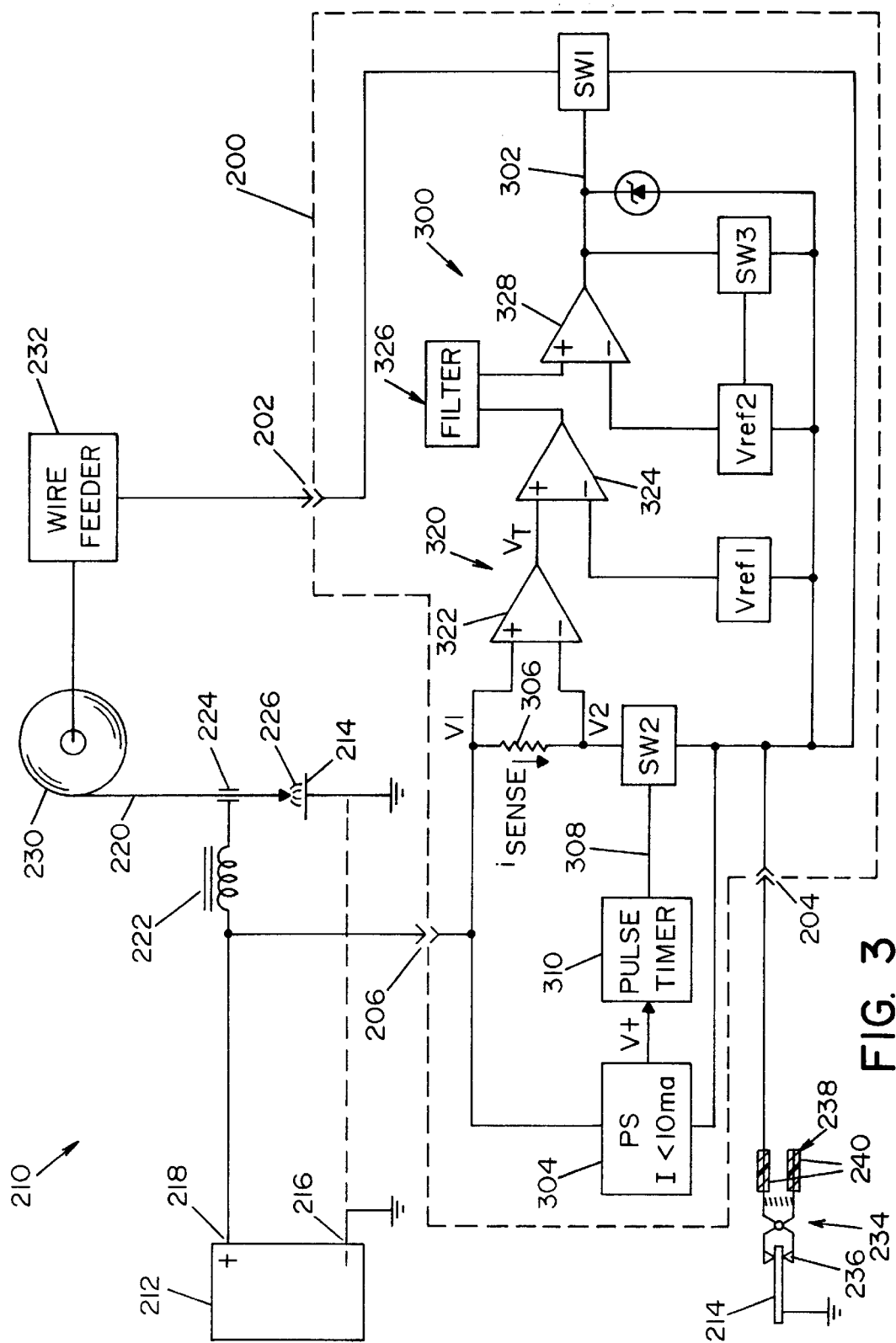
FIG. 3 is a schematic diagram illustrating an exemplary system for selectively allowing current to flow through an electrical device associated with a weld operation in accordance with one or more aspects of the present invention.

Referring now to FIG. 3, in accordance with the present invention, an exemplary discriminator system 200 is illustrated in a welding system 210, by which the above mentioned and other shortcomings associated with conventional systems may be avoided or mitigated. The welding system 210 is similar in most respects to the systems 10, 110 of FIGS. 1 and 2, respectively, comprising a workpiece 214 grounded to a power supply common terminal 216 of a welder 212. The welder 212 includes a power supply voltage terminal 218 providing electrical power to a welding wire 220 through an inductor 222 and a contact tip 224. An arc 226 is established thereby between the weld wire 220 and the workpiece 214, whereby controlled melting and deposition of the consumable wire 220 is achieved to effectuate a desired weld operation with respect to the workpiece 214. The contact tip 224 provides electrical connection between the inductor 222 and the weld wire 220, which is provided from a supply reel 230 by a wire feeder 232. The wire feeder device 232 obtains electrical power via the electrical connection of the inductor 222, the contact tip 224 and the weld wire 220 with the power supply voltage terminal 218.

In accordance with the invention, the discriminator system 200 (illustrated in dashed line in FIG. 3) is provided for selectively allowing current to flow through the wire feeder device 232, which comprises a first switch SW1, such as a transistor, relay, or other appropriate switching device, electrically connected between the wire feeder 232 and a grounding clamp device 234 via terminals 202 and 204, respectively. As with the ground clamps 34 and 134 described above, the clamping device 234 comprises spring biased jaws 236 and corresponding handles 238 having electrically insulating grips 240 thereon for handling by an operator. As illustrated and described in greater detail hereinafter, the switch SW1 is operable to selectively provide electrical connection between the wire feeder 232 and the ground clamp 234 (e.g., and thereby to selectively provide a return path to the power supply common 216) according to a first control signal 302, by which current may be selectively allowed to flow through the wire feeder 232 when an appropriate, low impedance grounding connection is established via the clamp 234. Thus, for instance, the switch SW1 may be closed to allow current flow in the wire feeder when the ground clamp 234 is properly connected to the workpiece 214, and opened when such connection is improper or undesirable. The discriminator system 200 further comprises a third terminal 206 for connection with the power supply voltage terminal 218 of the welder power supply 212, or alternatively with the voltage supplied thereby at other points in the welding system 210, such as at the wire feeder 232.

The discriminator system 200 comprises a sensor component or system 300 operative to sense or otherwise determine an impedance between the grounding clamp 234 and the power supply common 216, and further to provide the first control signal 302 to the switch SW1 according to the sensed impedance. In this manner, where the impedance is determined to be above a predetermined value or threshold (e.g., selected so as to indicate improper connection of the clamp 234), the control signal 302 may be provided so as to open the switch SW1, and thereby prevent damage or stress to the components in the welding system 210 and/or other adverse effects associated with high impedance grounding connections. For example, in one implementation of the invention, the exemplary sensor component 300 provides the first control signal 302 so as to prevent current flow through the wire feeder device 232 when the impedance between the ground clamp 234 and the power supply common 216 is greater than about 500 OHMs.

The exemplary discriminator system 200 further comprises a current limited power supply 304, wherein the supply 304 provides DC voltages to the various components of the sensor 300, while drawing no more than about 10 ma from the welder power supply voltage terminal 218 via the terminal 206. In order to sense the impedance of the return path connection, the sensor 300 comprises a sense resistor 306 having a first terminal V1 connected to the power supply voltage terminal 216 through the terminal 206 and a second switch SW2 serially connected between a second terminal V2 of the sense resistor 306 and the grounding clamp 234 via the terminal 204. The second switch SW2 operates to selectively connect the sense resistor 306 to the ground clamp 234 according to a second control signal 308 from a pulse timer circuit 310. The sensor 300 comprises a sensor circuit 320 operatively associated with the sense resistor 306 and the first switch SW1 to sense a voltage across the sense resistor 306 (e.g., V1–V2) and to provide the first control signal 302 to the first switch SW1 according to the sensed voltage V1–V2.

Figure 4:
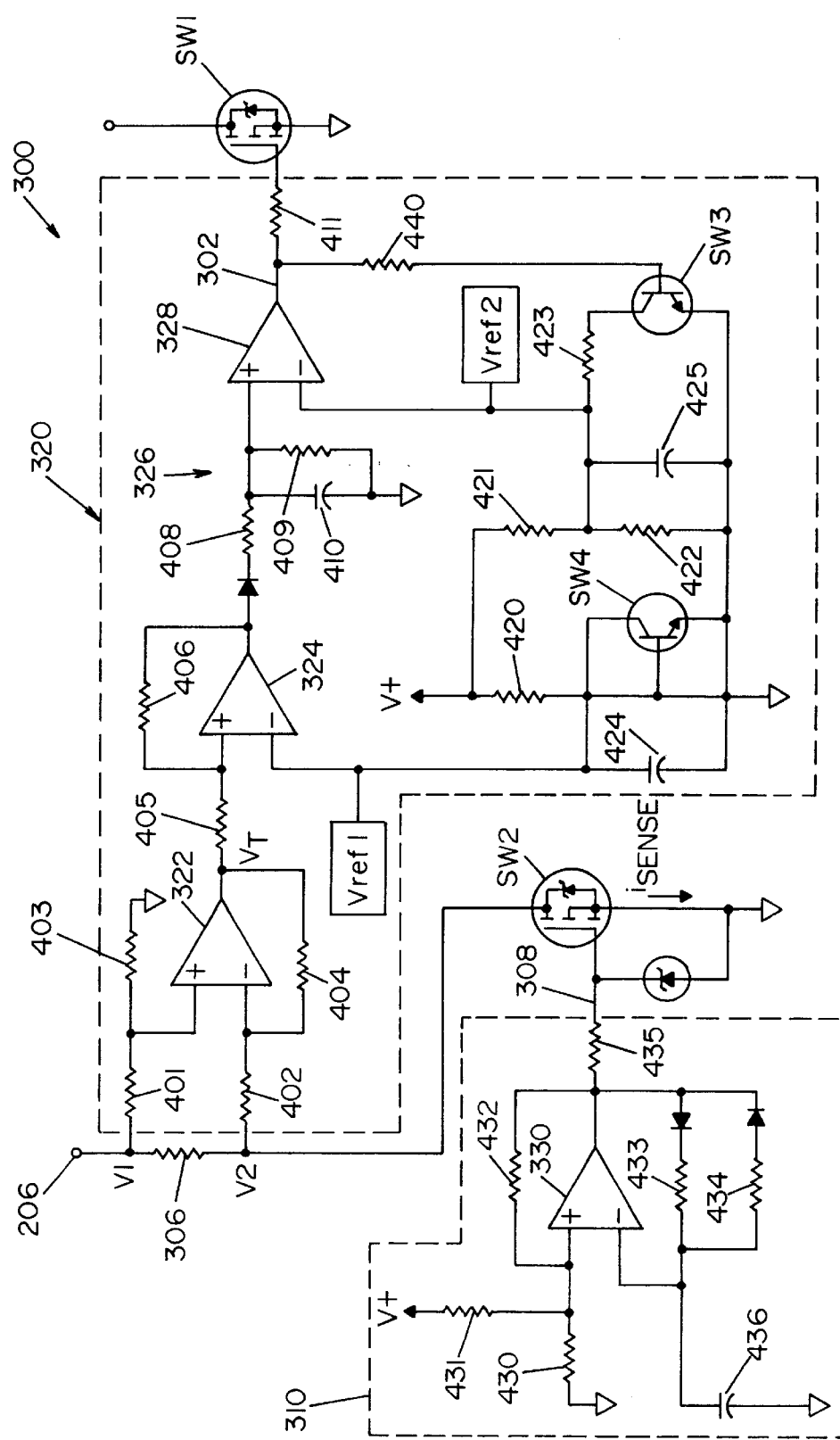
FIG. 4 is a schematic diagram illustrating further details of the system of FIG. 3.

Referring also to FIG. 4, the sensor circuit 320 comprises a differential amplifier 322 providing a signal $V_T$ according to the sensed voltage V1–V2 using resistors 401–404, where in the illustrated implementation, resistors 401 and 402 are 332 KOHMs and resistors 403 and 404 are 15 KOHMs. The sense resistor 306 in FIGS. 3 and 4 has an impedance of about 50 OHMs for discriminating return path connection impedances greater than about 500 OHMs for typical welder supply voltages of between about 20 and about 100 VDC. The exemplary configuration of the differential amplifier 322 and associated resistors 401–404 thus provides voltage signal $V_T$ representative of the voltage (e.g., V1–V2) across the sense resistor 306 divided by about 22. The voltage $V_T$ is then compared to a first reference voltage Vref1 using a comparator 324 and resistors 405 and 406, and filtered using a filter 326 comprising resistors 408 and 409, and a capacitor 410. The output of the filter 326 is provided as a non-inverting input to a second comparator 328 providing a comparison of the filter output with a second reference voltage Vref2, as the first control signal 302 through a resistor 411. The reference voltage Vref1 in the illustrated implementation is about 0.7 volts DC as provided from the supply voltage V+ from the current limited supply 304 via resistor 420, capacitor 424, and a transistor switch SW4, wherein the supply voltage V+ is about 15 VDC.

The pulse timer circuit 310 provides the second control signal 308 to the switch SW2 to selectively allow a sense current $i_{SENSE}$ to flow from the power supply voltage terminal 218 to the ground clamp 234 through the switch SW2 and the sense resistor 306. The timer circuit 310 comprises a comparator 330, resistors 430–435 having values of 332 KOHMS, 332 KOHMS, 221 KOHMS, 221 KOHMS, 475 KOHMS, and 3.32 KOHMS, respectively, and a capacitor 436 of about 0.2 F, and provides the second control signal 308 as a pulse width modulated (PWM) signal 308 having an on state with a corresponding on time of about 0.5 ms and an off state with an off time, wherein the period of the PWM signal 308 is about 100 ms. The second switch SW2 connects the sense resistor 306 to the grounding clamp 234 to allow sensing current $i_{SENSE}$ to flow from the power supply voltage terminal 218 through terminal 206, sense resistor 306, switch SW2, and terminal 204 to the clamp 234 when the PWM control signal 308 is in the on state, and disconnects the sense resistor 306 from the clamp 234 to prevent current flow $i_{SENSE}$ when the control signal 308 is in the off state. The on time and period (e.g., 0.5 ms and 100 ms, respectively) are selected in the exemplary timer circuit 310 so as to limit the average test current $i_{SENSE}$ through the ground clamp 234 to below about 10 ma. The value of the sense resistor 306 (e.g., about 50 OHMS) is set to allow the sensor circuit 320 to discriminate between solid or desirable (e.g., low impedance) connection of the grounding clamp 234 to the power supply common 216, and other (e.g.,less desirable) contact impedances in the range of about 1000 OHMS, such as about 500 OHMS or more, for a welding power supply range of between about 20 and about 100 VDC.

In operation, the exemplary system 200 senses the voltage V1–V2 across the sense resistor 306 resulting from the PWM closure of switch SW2 using the differential amplifier 322, and if the voltage V1–V2 is less than about 15 volts, the comparator 324 provides a low output (e.g., near 0 volts). In this regard, the differential amplifier scales the voltage V1–V2 by a factor of about 22 by virtue of the sizing of resistors 401–404, by which a voltage V1–V2 of 15 volts provides a voltage $V_T$ to the comparator 324 of about 0.7 volts. This voltage $V_T$, in turn, is compared with Vref1 using the comparator 324, wherein Vref1 is set to about 0.7 volts via resistor 420 and the bipolar transistor switch SW4, and stabilized using capacitor 424. The output of the comparator 324 is thus low when V1–V2 is less than about 15 volts DC and high (e.g., about 15 volts according to the supply level V+) when V1–V2 is greater than about 15 volts during the on time of the PWM control signal 308. In this manner, the impedance between the power supply voltage terminal 216 and the grounding clamp 234 is compared with a threshold value, since the value of the sense resistor 306 is known.

For instance, where the sense resistor 306 is about 50 OHMs, and where the power supply voltage is about 100 volts DC, a zero impedance connection of the ground clamp 234 to the power supply common 216 will result in a voltage V1–V2 across sense resistor 306 of 100 volts, wherein the current $i_{SENSE}$ will be about 2 amps during the on time of the PWM signal 308, resulting in a high output signal pulse from the comparator 324 (e.g., thus indicating a good ground clamp connection). It is noted in this regard, that although the current $i_{SENSE}$ is relatively high (e.g., 2 amps in this example) during the on time of the signal 308, the continuous or average sense current $i_{SENSE}$ is much smaller, such as about 10 ma, where the on time is about 0.5 ms, and the PWM period is about 100 ms. Thus, the average sense current $i_{SENSE}$ is kept low enough to prevent adverse effects, while allowing sensing or measurement of the grounding connection impedance. Where there is a less desirable ground clamp connection, for example, where the ground clamp 234 is connected to the power supply common through an impedance of about 1000 OHMS (e.g., where the clamp 234 is corroded or otherwise does not properly connect directly to the metal workpiece 214), the closure of the switch SW2 during the on time of the PWM control signal 308 connects the power supply voltage (e.g., again 100 volts DC for purposes of illustration) across about 1050 OHMs (e.g., 1000 OHMs+sense resistor 306 impedance of 50 OHMs), resulting in an instantaneous sense current $i_{SENSE}$ of about 95 ma, and an average current level of about 0.5 ma. The resulting sensed voltage V1–V2 during closure of the switch SW2 is about 4.75 volts, whereby the output of the comparator 324 is low (e.g., thus indicating an undesirable ground clamp connection).

In the exemplary sensor circuit 320, the output of the comparator 324 is filtered, using resistors 408 and 409 as well as the capacitor 410, such that the non-inverting input to the second comparator 328 will rise above about 9 volts DC after two or three high pulses from the output of the comparator 324 (e.g., the exemplary components 408, 409, and 410 having values of about 1 KOHM, 332 KOHMs, and 1.0 $\mu$F, respectively). Since the period of the PWM control signal 308 is set to about 100 ms, this means that the non-inverting input to the second comparator 328 will rise above about 9 volts when a proper ground clamping impedance has been sensed for at least about 200 ms, such as two or three periods of the PWM control signal 308. The second reference Vref2 is initially set to about 9 volts via resistors 421 and 422 having values of about 100 KOHMs and 150 KOHMs, respectively, and stabilized by the capacitor 425 (e.g., about 0.022 $\mu$F, where the transistor switch SW3 is initially off. When the non-inverting input of comparator 328 rises above this threshold Vref2 (e.g., at least about 200 ms after detection of proper ground connection impedance), the output of the comparator 328 transitions from low too high (e.g., to about 15 volts according to the supply level V+), causing the first switching device SW1 to allow current to conduct from the return line of the wire feeder 232 to the ground clamp 234. At this point, the bipolar transistor switch SW3 turns on via resistor 440 (e.g., about 100 KOHMs), pulling the reference voltage Vref2 down to about 3 volts via resistor 423 having a value of about 33 KOHMs.

Thereafter, the switch SW1 (e.g., a FET or other appropriate switching device) allows the wire feeder 232 to operate in normal fashion, providing an electrical return path connection through the grounding clamp 234 to the power supply common terminal 216. The timer circuit 310 continues to provide pulsed sense current through the sense resistor 306 and the switch SW2 by pulse width modulation of the control signal 308, in order to continuously monitor the propriety of the ground clamp connection impedance. If for some reason, the impedance of the connection of the ground clamp 234 to the power supply common 216 increases, no high pulses will appear at the output of the comparator 324. If this condition remains for two or three PWM periods (e.g., for about 200 ms), the comparator 328 changes state, providing a low output signal 302 to turn off the switch SW1. In this manner, the conduction of current through the wire feeder 232 will be inhibited upon or shortly after detection of improper grounding conditions in the welding system 210, thereby preventing or mitigating device damage or other adverse effects associated therewith. Once the switch SW1 has bee opened, the transistor switch SW3 again turns off, by which the reference value Vref2 returns to about 9 volts after which the system 200, operates to continue sensing ground connection impedance, and will selectively allow conduction through SW1 again about 200–300 ms after proper grounding has been reestablished.

The discriminator system 200 illustrated in FIGS. 3 and 4 and described hereinabove is but one possible implementation of the various aspects of the present invention. Other systems are possible within the scope of the appended claims. For instance, any appropriate switching devices may be employed in selectively allowing or inhibiting current flow from the wire feeder 232 to the ground clamp 234, including but not limited to relays, and other forms of magnetic or semiconductor switching devices. Similarly, many other forms of sense current switching device SW2 maybe employed in accordance with the invention, apart from that illustrated and described herein. In addition, the various timer components and values of the timer circuit 310 may be adjusted or selected according to desired operation of a given application. Thus, any appropriate PWM signal (e.g., on time, off time, period, etc.) may be employed in sensing the impedance of interest. In addition, the sensing apparatus in the sensor circuit 320 may be altered and designed for other applications within the scope of the present invention, by which a grounding impedance can be ascertained, and appropriate selective switching can be achieved. Moreover, the sense resistor 306 value maybe selected in order to discriminate or differentiate between any appropriate threshold impedance values apart from that illustrated and described hereinabove.

The above illustrated and other systems and apparatus may be used to implement methods for selectively allowing current to flow through an electrical device in according to the present invention. For instance, the invention comprises sensing an impedance between a grounding device and a power supply common and selectively connecting an electrical device (e.g., such as a wire feeder or other electrical device associated with a welding operation) to the grounding device according to the sensed impedance. For instance, in the above implementations of FIGS. 3 and 4, the wire feeder device 232 maybe connected to the grounding device if the sensed impedance is less than a threshold value and disconnected therefrom when the impedance is greater than the threshold value. In this regard, the various methodologies of the invention may be practiced in association with the apparatus and systems illustrated and described herein, as well as with other systems. Moreover, the apparatus of the invention may be us;ed to implement the methods of the invention, as well as other techniques and methodologies apart from the claimed methods.

While the invention has been illustrated and described hereinabove with respect to one or more implementations, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as maybe desired and advantageous for any given or particular application. Furthermore, to the extent that the terms "includes", "having", "has", "with", or variants thereof are used in the detailed description and/or in the claims, such terms are intended to be inclusive in a manner similar to the term "comprising."

Having thus described the invention, the following is claimed:

1. A discriminator system for selectively allowing current to flow through an electrical device associated with a weld operation, said discriminator system comprising: a first switch component operatively associated with said electrical device and a grounding device to selectively provide electrical connection therebetween according to a first control signal; a sensor component operatively associated with said grounding device to sense an impedance between said grounding device and a power supply common and providing said first control signal to said first switch component according to said impedance; a sense resistor having a first terminal in electrical communication with a power supply voltage terminal; a second switch component operative to selectively connect a second terminal of said sense resistor to said grounding device according to a second control signal; a sensor circuit operatively associated with said sense resistor and said first switch component to sense a voltage across said sense resistor and to provide said first control signal to said first switch component according to said voltage across said sense resistor; and a timer circuit providing said second control signal to said second switch component.

2. The discriminator system of claim 1, wherein said sensor component provides said first control signal having a first state when said impedance is less than a threshold value and a second state when said impedance is greater than said threshold value, and wherein said first switch component is operable to provide electrical connection between said electrical device and said grounding device when said first control signal is in said first state and to interrupt electrical connection between said electrical device and said grounding device when said first control signal is in said second state.

3. The discriminator system of claim 1, wherein said first switch component comprises one of a transistor and a relay.

4. The discriminator system of claim 1, wherein said sense resistor has an impedance of about 50 OHMs and wherein said voltage across said sense resistor is indicative of an impedance between said grounding device and said power supply common.

5. The discriminator system of claim 4, wherein said sensor component provides said first control signal so as to prevent current flow through said electrical device when said impedance between said grounding device and said power supply common is greater than about 500 OHMs.

6. The discriminator system of claim 5, wherein said sensor circuit provides said first control signal so as to prevent current flow through said electrical device when said impedance between said grounding device and said power supply common is greater than about 500 OHMs for at least about 200 ms.

7. The discriminator system of claim 1, wherein said sensor component provides said first control signal so as to prevent current flow through said electrical device when said impedance between said grounding device and said power supply common is greater than about 500 OHMs.

8. A discriminator system for selectively allowing current to, flow through an electrical device associated with a weld operation, said discriminator system comprising:

a first switch component operatively associated with said electrical device and a grounding device to selectively provide electrical connection therebetween according to a first control signal;

a sensor component operatively associated with said grounding device to sense an impedance between said grounding device and a power supply common and providing said first control signal to said first switch component according to said impedance, said sensor component providing said first control signal having a first state when said impedance is less than a threshold value and a second state when said impedance is greater than said threshold value, and wherein said first switch component is operable to provide electrical connection between said electrical device and said grounding device when said first control signal is in said first state and to interrupt electrical connection between said electrical device and said grounding device when said first control signal is in said second state, said sensor component comprising a sense resistor having a first terminal in electrical communication with a power supply voltage terminal, a second switch component operative to selectively connect a second terminal of said sense resistor to said grounding device according to a second control signal, and a timer circuit providing said second control signal to said second switch component; and a sensor circuit operatively associated with said sense resistor and said first switch component to sense a voltage across said sense resistor and to provide said first control signal to said first switch component according to said voltage across said sense resistor.

9. The discriminator system of claim 8, wherein said timer circuit provides said second control signal as a pulse width modulated signal having an on state with a corresponding on time and an off state with a corresponding off time, and wherein said second switch component connects said second terminal of said sense resistor to said grounding device to allow current to flow from said power supply voltage terminal to said grounding device through said sense resistor when said second control signal is in said on state, and disconnects said sense resistor from said grounding device to prevent current flow from said power supply voltage terminal to said grounding device through said sense resistor when said second control signal is in said off state.

10. The discriminator system of claim 9, wherein said pulse width modulated signal has a period of about 100 ms and an on time of about 0.5 ms.

11. The discriminator system of claim 10, comprising a first terminal operative to electrically connect a first terminal of said first switch component with said electrical device, a second terminal operative to electrically connect a second-terminal of said first switch component with said grounding device, and a third terminal operative to electrically connect said first terminal of said sense resistor with said power supply voltage terminal.

12. A discriminator system for selectively allowing current to flow through an electrical device associated with a weld operation, said discriminator system comprising:

a first switch component operatively associated with said electrical device and a grounding device to selectively provide electrical connection therebetween according to a first control signal;

a sensor component operatively associated with said grounding device to sense an impedance between said grounding device and a power supply common and providing said first control signal to said first switch component according to said impedance;

a sense resistor having a first terminal in electrical communication with a power supply voltage terminal;

a second switch component operative to selectively connect a second terminal of said sense resistor to said grounding device according to a second control signal;

a sensor circuit operatively associated with said sense resistor and said first switch component to sense a voltage across said sense resistor and to provide said first control signal to said first switch component according to said voltage across said sense resistor; and said sensor component further comprising a timer circuit providing said second control signal to said second switch component.

13. The discriminator system of claim 12, wherein said timer circuit provides said second control signal as a pulse width modulated signal having an on state with a corresponding on time and an off state with a corresponding off time, and wherein said second switch component connects said second terminal of said sense resistor to said grounding device to allow current to flow from said power supply voltage terminal to said grounding device through said sense: resistor when said second control signal is in said on state, and disconnects said sense resistor from said grounding device to prevent current to flow from said power supply voltage terminal to said grounding device through said sense resistor when said second control signal is in said off state.

14. The discriminator system of claim 13, wherein said pulse width modulated signal has a period of about 100 ms and an on time of about 0.5 ms.

15. The discriminator system of claim 14, comprising a first terminal operative to electrically connect a first terminal of said first switch component with said electrical device, a second terminal operative to electrically connect a second terminal of said first switch component with said grounding device, and a third terminal operative to electrically connect said first terminal of said sense resistor with said power supply voltage terminal.

16. A method of selectively allowing current to flow through an electrical device having a first terminal connected to a power supply voltage associated with a weld operation, comprising:

sensing an impedance between a grounding device and a power supply common; and selectively connecting a second terminal of said electrical device to said grounding device according to said sensed impedance.

17. The method of claim 16, wherein selectively connecting said second terminal of said electrical device to said grounding device according to said sensed impedance comprises electrically connecting said second terminal to said grounding device if said sensed impedance is less than a threshold value and disconnecting said second terminal from said grounding device if said impedance is greater than said threshold value.

18. The method of claim 17, wherein sensing an impedance between a grounding device and a power supply common comprises selectively connecting a sense resistor between a power supply voltage terminal and said grounding device, and sensing a voltage across said sense resistor.

19. The method of claim 18, wherein selectively connecting said second terminal of said electrical device to said grounding device according to said sensed impedance comprises providing a control signal to a switching device positioned between said second terminal of said electrical device and said grounding device according to said voltage across said sense resistor.

20. The method of claim 18, wherein selectively connecting said sense resistor between said power supply voltage terminal and said grounding device comprises:

connecting a first terminal of said sense resistor to said power supply voltage terminal;

providing a pulse width modulated signal to a second switching device positioned between a second terminal of said sense resistor and said grounding device, said pulse width modulated signal having an on state with a corresponding on time and an off state with a corresponding off time;

connecting said second terminal of said sense resistor to said grounding device using said second switching device to allow current to flow from said power supply voltage terminal to said grounding device through said sense resistor when said pulse width modulated signal is in said on state; and disconnecting said sense resistor from said grounding device using said second switching device to prevent current to flow from said power supply voltage terminal to said grounding device through said sense resistor when said pulse width modulated signal is in said off state.

21. The method of claim 20, wherein providing said pulse width modulated signal to said second switching device comprises providing said pulse width modulated signal having a period of about 100 ms and an on time of about 0.5 ms.

22. The method of claim 18, wherein sensing an impedance between a grounding device and power supply common comprises correlating said voltage across said sense resistor with a sensed impedance between said grounding device and said power supply common, and wherein selectively connecting said second terminal of said electrical device to said grounding device according to said sensed impedance comprises disconnecting said second terminal from said grounding device when said sensed impedance is greater than about 500 OHMs.

23. The method of claim 22, wherein selectively connecting said second terminal of said electrical device to said grounding device according to said sensed impedance comprises disconnecting said second terminal from said grounding device when said sensed impedance is greater than about 500 OHMs for at least about 200 ms.

24. The method of claim 16, wherein selectively connecting said second terminal of said electrical device to said grounding device according to said sensed impedance comprises electrically connecting said second terminal to said grounding device if said sensed impedance is less than about 500 OHMs and disconnecting said second terminal from said grounding device when said impedance is greater than about 500 OHMs.

25. A system for selectively allowing current to flow through an electrical device associated with a weld operation, comprising:

means for sensing an impedance between a grounding device and a power supply common; and means for selectively connecting a second terminal of said electrical device to said grounding device according to said sensed impedance.

26. The system of claim 25, wherein said means for selectively connecting a second terminal of said electrical device to said grounding device comprises a first switching device adapted to selectively provide electrical connection! between said electrical device and said grounding device according to a first control signal, and wherein said means for sensing an impedance comprises a sensor adapted to sense an impedance between said grounding device and a power supply common and to provide said first control signal to said first switching device according to said impedance.

27. The system of claim 26, wherein said sensor is adapted to provide said first control signal having a first state when said impedance is less than a threshold value and a second state when said impedance is greater than said threshold value, and wherein said first switching device is adapted to provide electrical connection between said electrical device and said grounding device when said first control signal is in said first state and to interrupt electrical connection between said electrical device and said grounding device when said first control signal is in said second state.

28. The system of claim 27, wherein said sensor comprises a sense resistor having a first terminal in electrical communication with a power supply voltage terminal, a second switching device adapted to selectively connect a second terminal of said sense resistor to said grounding device according to a second control signal, and a sensor circuit adapted to sense a voltage across said sense resistor and to provide said first control signal to said first switching device according to said voltage across said sense resistor.

29. The system of claim 28, wherein said sensor further comprises a timer circuit providing said second control signal to said second switching device, wherein said timer circuit provides said second control signal as a pulse width modulated signal having an on state with a corresponding on time and an off state with a corresponding off time, and wherein said second switching device connects said second terminal of said sense resistor to said grounding device to allow current to flow from said power supply voltage terminal to said grounding device through said sense resistor when said second control signal is in said on state, and disconnects said sense resistor from said grounding device to prevent current to flow from said power supply voltage terminal to said grounding device through said sense resistor when said second control signal is in said off state.

30. The system of claim 29, wherein said sensor provides said first control signal so as to prevent current flow through said electrical device when said impedance between said grounding device and said power supply common is greater than about 500 OHMs.

31. A system for determining an impedance between a grounding clamp and a power supply common, comprising:
- a sense resistor having a first terminal in electrical communication with one of a power supply voltage terminal and said grounding device;
- a switching device operative to selectively connect a second terminal of said sense resistor to said other of said power supply voltage terminal and said grounding device; and
- a sensor circuit operative to sense a voltage across said sense resistor and to provide a signal indicative of said impedance between said grounding clamp and said power supply common according to said voltage across said sense resistor.

32. The system of claim 31, wherein said switching device is adapted to selectively connect said second terminal of said sense resistor to said other of said power supply voltage terminal and said grounding device according to a control signal, further comprising a timer circuit providing said control signal to said switching device.

33. The system of claim 32, wherein said timer circuit is adapted to provide said control signal as a pulse width modulated signal having an on state with a corresponding on time and an off state with a corresponding off time, and wherein said switching device is adapted to connect said second terminal of said sense resistor to said other of said power supply voltage terminal and said grounding device to allow current to flow from said power supply voltage terminal to said grounding device through said sense resistor when said control signal is in said on state, and to disconnect said sense resistor from said other of said power supply voltage terminal and said grounding device to prevent current flow from said power supply voltage terminal to said grounding device through said sense resistor when said control signal is in said off state.

34. A discriminator system for allowing current to flow through an electrical device in a welding operation, comprising:
- a first switch for providing electrical connection between said electrical device and a grounding device according to a first control signal;
- a sensor component for sensing an impedance between said grounding device and a power supply and for providing said first control signal to said first switch according to said impedance;
- a sense resistor having a first terminal in electrical communication with a power supply voltage terminal;
- a second switch for selectively connecting a second terminal of said sense resistor to said grounding device according to a second control signal; and,
- a timer circuit for providing said second control signal to said second switch.

\* \* \* \* \*